(12) United States Patent
Zeng et al.

(10) Patent No.: US 7,413,221 B2
(45) Date of Patent: Aug. 19, 2008

(54) AIRBAG APPARATUS WITH ACCUMULATOR

(75) Inventors: Simin Zeng, Rochester Hills, MI (US); Mark C. Woydick, Lake Orion, MI (US)

(73) Assignee: TK Holdings Inc., Auburn Hills, MI (US)

( * ) Notice: Subject to any disclaimer, the term of this patent is extended or adjusted under 35 U.S.C. 154(b) by 387 days.

(21) Appl. No.: 11/166,219

(22) Filed: Jun. 27, 2005

(65) Prior Publication Data

US 2006/0290120 A1 Dec. 28, 2006

(51) Int. Cl.
*B60R 21/26* (2006.01)

(52) U.S. Cl. .................... 280/742; 280/728.1; 280/731; 280/732; 280/736

(58) Field of Classification Search ............. 280/728.1, 280/731, 732, 736, 742; *B60R 21/16, 21/26*
See application file for complete search history.

(56) References Cited

U.S. PATENT DOCUMENTS

| | | | |
|---|---|---|---|
| 5,290,060 A | 3/1994 | Smith | |
| 5,344,186 A | 9/1994 | Bergerson et al. | |
| 5,350,192 A | 9/1994 | Blumenthal | |
| 5,360,232 A | 11/1994 | Lowe et al. | |
| 5,456,492 A | 10/1995 | Smith et al. | |
| 5,577,769 A | 11/1996 | Di Giacomo et al. | |
| 5,616,883 A | 4/1997 | Hamilton et al. | |
| 5,791,597 A * | 8/1998 | Knoll .......................... 244/121 |
| 5,803,493 A | 9/1998 | Paxton et al. | |
| 5,890,735 A | 4/1999 | Smith | |
| 6,010,153 A | 1/2000 | Halas et al. | |
| 6,032,979 A * | 3/2000 | Mossi et al. ................. 280/741 |
| 6,039,347 A * | 3/2000 | Maynard ..................... 280/736 |
| 6,068,289 A * | 5/2000 | Bosio ......................... 280/736 |
| 6,206,418 B1 | 3/2001 | Perotto et al. | |
| 6,315,322 B1 * | 11/2001 | Mika .......................... 280/736 |
| 6,367,838 B1 * | 4/2002 | Faigle et al. ................. 280/736 |
| 6,431,595 B1 | 8/2002 | Swann et al. | |
| 6,502,857 B2 | 1/2003 | Nakanishi et al. | |
| 6,676,157 B2 * | 1/2004 | Nanbu ........................ 280/736 |
| 6,739,362 B2 | 5/2004 | Lell | |
| 6,749,220 B1 * | 6/2004 | Wipasuramonton et al. ...... 280/743.1 |
| 6,808,202 B2 | 10/2004 | Lebaudy et al. | |
| 6,871,871 B2 * | 3/2005 | Parizat et al. ................ 280/736 |
| 2001/0048215 A1 * | 12/2001 | Breed et al. ............... 280/728.1 |
| 2003/0047924 A1 | 3/2003 | Perotto et al. | |
| 2005/0062272 A1 | 3/2005 | Smith et al. | |

* cited by examiner

*Primary Examiner*—Christopher Ellis
*Assistant Examiner*—Jacob Meyer
(74) *Attorney, Agent, or Firm*—Foley & Lardner LLP

(57) ABSTRACT

An airbag apparatus includes an airbag, an inflator, and an accumulator. The airbag is configured to be stored in a vehicle before inflation. The inflator is configured to provide gas for inflating the airbag. The accumulator is in fluid communication with the airbag and the inflator. The accumulator includes a chamber for at least temporarily storing gas after the inflator provides gas. The accumulator also includes a flow-control mechanism configured to permit gas to flow into the chamber at a first rate and to flow out of the chamber at a slower second rate.

12 Claims, 5 Drawing Sheets

High Pressure    Lower Pressure (a)

(b)

AIRBAG APPARATUS WITH ACCUMULATOR

BACKGROUND

An inflatable airbag system used in an automobile often must be able to maintain adequate internal gas pressure in its airbag over an extended period of time (on the order of seconds). This is particularly true in rollover applications, where protection provided by the airbag may be needed for a longer time.

Conventional airbag systems typically maintain pressure in the airbag by using a combination of a sealed airbag and a low-gas-temperature inflator (such as a stored gas device). A sealed airbag typically maintains pressure longer than other airbags, such as partially sealed airbags, unsealed airbags, and higher permeability airbags. A low-gas-temperature inflator is more conducive to maintaining pressure than inflators that generate and release higher temperature gases (such as hybrid and pyrotechnic inflators). The high-gas-temperature inflators produce relatively high temperature gas that will quickly cool while in the airbag. The gas will decrease in volume as it cools, and thus there will be less internal pressure in the airbag and the airbag will lose its fullness.

It is desirable to provide an airbag system that can readily maintain adequate internal gas pressure in its airbag. It is particularly desirable to provide such a system that can accommodate a variety of airbags (e.g., partially sealed airbags, unsealed airbags, and higher permeability airbags) and a variety of inflators (e.g., hybrid and pyrotechnic inflators).

SUMMARY

An aspect of the present invention relates to an airbag apparatus that includes an airbag, an inflator, and an accumulator. The airbag is configured to be stored in a vehicle before inflation. The inflator is configured to provide gas for inflating the airbag. The accumulator is in fluid communication with the airbag and the inflator. The accumulator includes a chamber for at least temporarily storing gas after the inflator provides gas. The accumulator also includes a flow-control mechanism configured to permit gas to flow into the chamber at a first rate and to flow out of the chamber at a slower second rate.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
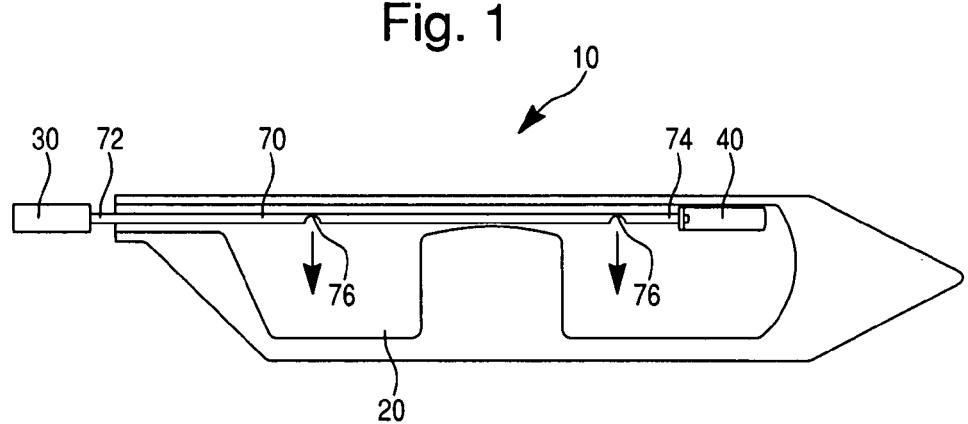
FIG. 1 is a diagrammatic sketch of an embodiment of an airbag apparatus according to the present invention.

Presently preferred embodiments of the invention are illustrated in the drawings. An effort has been made to use the same or like reference numbers throughout the drawings to refer to the same or like parts.

An embodiment of an airbag apparatus 10 according to the present invention is shown in FIGS. 1-8. The airbag apparatus 10 preferably includes an airbag 20, an inflator 30, and an accumulator 40. It is expected that the airbag apparatus 10 typically will be used in automobiles. It could be used, however, in other environments.

The airbag 20 can be configured to cushion an occupant of an automobile. For example, the airbag 20 could be a conventional sealed airbag. As discussed in more detail below, an airbag apparatus 10 according to the present invention can also be configured to permit use of other types of airbags, such as a partially sealed airbag, unsealed airbag, or higher permeability airbag, as known in the art. When the airbag apparatus 10 is used in an automobile, the airbag 20 preferably is an AB cushion and is stored in the upper side portion of the vehicle body near the boundary between the ceiling of the vehicle body and the side portion of the vehicle body along the window or the like of the side door (not shown), so as to be elongated in the fore-and-aft direction of the vehicle body. The airbag 20, however, could be stored in different locations, such as a door, dashboard, or steering wheel.

The inflator 30 is configured to inflate the airbag 20. The inflator 30 can be a conventional inflator used in airbag systems, such as a low-gas-temperature inflator. As discussed in more detail below, an airbag apparatus 10 according to the present invention can be configured to permit use of other inflators, such as an inflator that produces relatively high temperature gas.

The airbag apparatus 10 can include a gas-inlet passage 70 that facilitates fluid communication between the inflator 30 and the accumulator 40. Though an airbag apparatus 10 according to the present invention can be constructed without this gas-inlet passage 70, use of the gas-inlet passage 70 is preferred. The gas-inlet passage 70 could be, for example, a cylindrical diffuser tube of the type disclosed in U.S. Pat. No. 6,502,857 B2, the entire contents of which is hereby incorporated by reference. The gas-inlet passage 70 can be configured in a variety of ways and can be constructed of various materials, as known in the art.

In the preferred embodiment, the gas-inlet passage 70 extends between the inflator 30, which is connected to a first end 72 of the gas-inlet passage 70, and the accumulator 40, which is connected to a second end 74 of the gas-inlet passage 70. The gas-inlet passage 70 can include gas exhaust ports 76, which release gas into the airbag 20. Typically gas flow along the gas-inlet passage 70 is less restricted than gas flow out of the exhaust ports 76. Thus, when the inflator 30 provides gas, the gas will flow quickly forward within the gas-inlet passage

70. When the gas reaches the accumulator 40 it will be inhibited from further forward flow, which causes a sudden increase in the internal pressure in the gas-inlet passage 70. Gas then flows from the gas exhaust ports 76 into the airbag 20 to inflate the airbag 20.

The accumulator 40 is in fluid communication with the airbag 20 and the inflator 30. Preferably the accumulator 40 is configured to relatively quickly accumulate gas upon deployment of the inflator 30 and then relatively slowly release at least some of that gas into the airbag 20 over a more extended period of time. In the preferred configuration, the accumulator 40 will begin to release gas into the airbag 20 immediately following deployment of the inflator 30.

Figure 2:
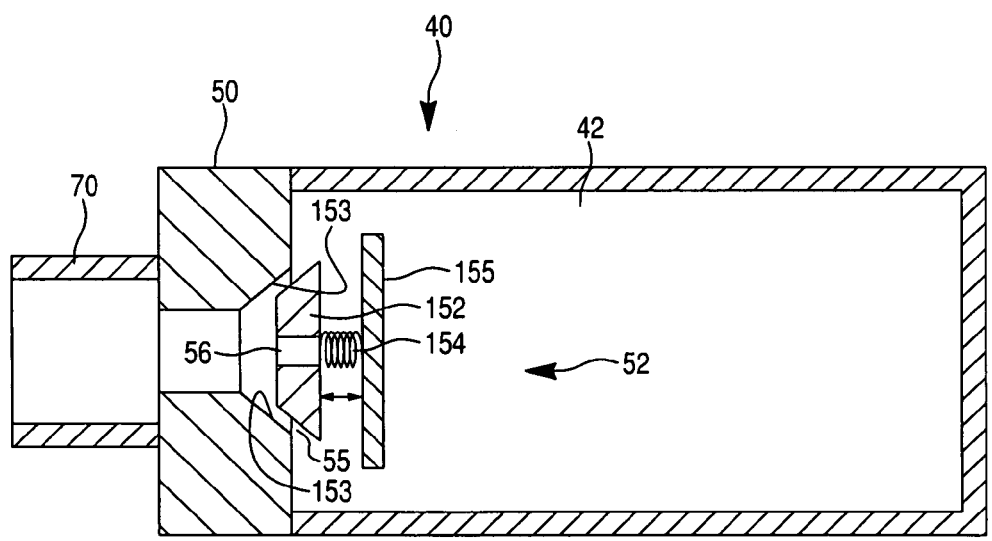
FIG. 2 is a cross-sectional view of an embodiment of an accumulator of the airbag apparatus of FIG. 1.

As shown in FIG. 2, the accumulator 40 includes a chamber 42 for at least temporarily storing gas after the inflator 30 provides gas. The accumulator 40 can be configured such that, before the inflator 30 provides gas, the chamber 42 contains gas at ambient pressure. As an alternative, the chamber 42 can contain gas that is under pressure (i.e., it is at a pressure greater than the ambient pressure) before the inflator 30 provides additional gas.

The chamber 42 can be constructed of a rigid material and have a configuration that will cause it to have a fixed volume under normal operating conditions. For example, such a chamber 42 can be made of steel, aluminum, reinforced thermo-plastic material, carbon fiber, or related structural materials. Alternatively, the chamber 42 can be constructed of a material or configured such that it will substantially elastically expand when pressurized gas is introduced to the chamber 42 following actuation of the inflator 30 to increase in volume. For example, such a chamber 42 can be made of steel, aluminum, reinforced thermo-plastic material, carbon fiber, or related structural materials. If an expandable material or configuration is used, additional energy will be stored by the accumulator 40 due to the expansion of the chamber 42. This additional energy will be released as the chamber 42 releases gas to the airbag 20, to further help pressurize the airbag 20 over an extended time period. Preferably the volume of the chamber 42 is at least 0.25 to 5 times the volume of the inflator 30.

The accumulator 40 includes a flow-control mechanism 50 configured to permit gas to flow into the chamber 42 at a first rate and to flow out of the chamber 42 at a slower second rate. In a preferred embodiment, the flow-control mechanism 50 allows a maximum-volumetric-gas-flow rate into the chamber 42 that is approximately equal to the output rate of the inflator 30, and allows a maximum-volumetric-gas-flow rate out of the chamber 42 of no greater than approximately 75% of the in-flow volumetric-gas-flow rate. The actual volumetric gas flow rate into and out of the chamber 42 may change during the operation of the accumulator 40 based on, for example, the gas pressure inside and outside the chamber 42. The maximum-volumetric-gas-flow rate permitted by the accumulator 40, however, affects the time required to fill the chamber 42 and the time period over which the chamber 42 will release gas into the airbag 20.

The accumulator 40 can be configured to relatively quickly accumulate gas upon deployment of the inflator 30 and then relatively slowly release at least some of that gas into the airbag 20 over a more extended period of time. For example, in an accumulator 40 having a chamber 42 with a volume of 0.25 to 5 times the volume of the inflator 30 and a flow-control mechanism 50 permitting the above-mentioned maximum-volumetric-gas-flow rates, the accumulator 40 can be configured such that a maximum amount of gas is introduced to the chamber 42 in less than about ten milliseconds, more preferably in less than about five milliseconds, and the accumulator 40 releases gas into the airbag 20 for at least about 0.1 seconds, more preferably at least about 0.5 seconds, and even more preferably at least about 2 seconds.

The accumulator 40 may be disposed inside the airbag 20, as shown in FIG. 1. The accumulator 40 also can be disposed outside of the airbag 20 (not shown) but in fluid communication with the airbag 20.

The flow-control mechanism 50 can have a variety of configurations. For example, the flow-control mechanism 50 could be a single input/output device that allows gas flow into the chamber 42 and gas flow out of the chamber 42. An example of such a flow-control mechanism 50 is a two-way valve 52, shown in FIG. 2. The two-way valve 52 has a cone 152 that is biased towards surfaces 153 by a spring 154 connected to a member 155. The member 155 extends only part way across the chamber 42. In the absence of a gas pressure differential, the spring 154 will hold the cone 152 against the surfaces 153. When the force of gas in the gas-inlet passage 70 is sufficiently greater than the force of gas in the chamber 42, the gas will push the cone 152 away from the surfaces 153. The gas can then flow quickly into the chamber 42 through the input orifice 55 formed in the space between the cone 152 and the surfaces 153. When the force of gas in the gas-inlet passage 70 decreases sufficiently, the spring 154 will push the cone 152 against the surfaces 153. The cone 152 can include an output orifice 59 that permits gas flow out of the chamber 42.

Figure 3:
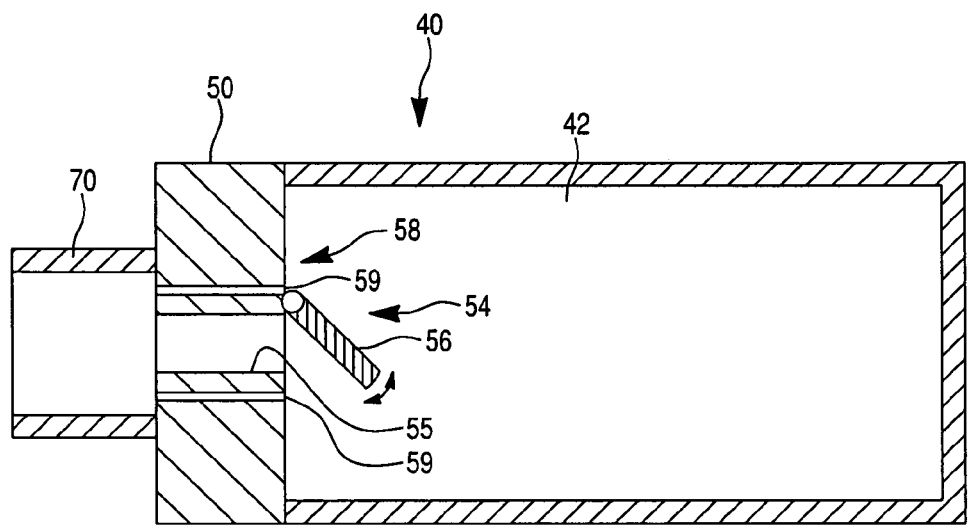
FIG. 3 is a cross-sectional view of another embodiment of an accumulator of the airbag apparatus of FIG. 1.
Figure 4:
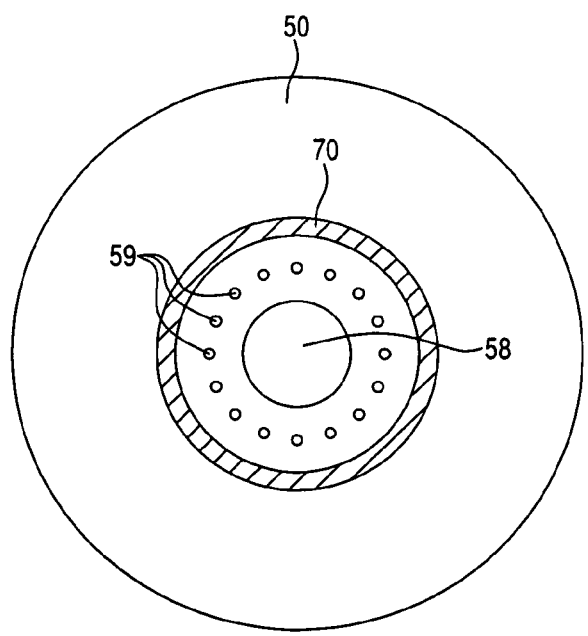
FIG. 4 is a partial cross-sectional view of the accumulator of FIG. 3.
Figure 5:
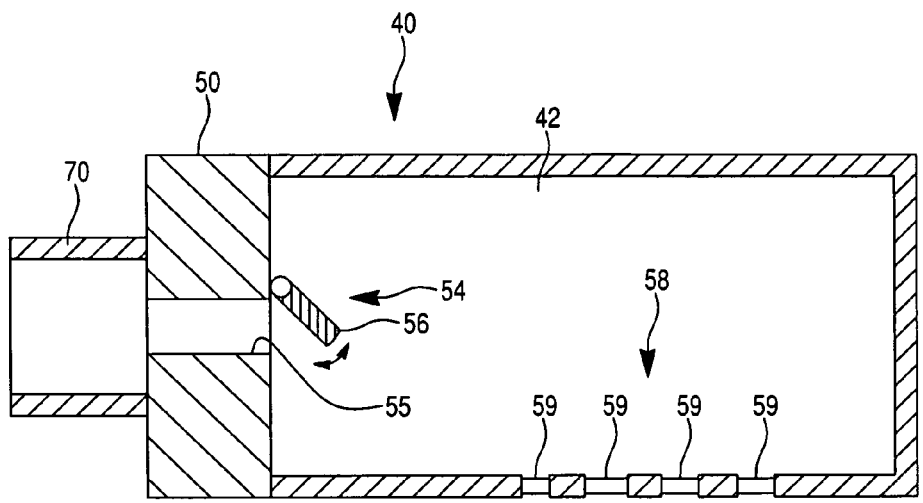
FIG. 5 is a cross-sectional view of another embodiment of an accumulator of the airbag apparatus of FIG. 1.

Alternatively, the flow-control mechanism 50 could have a input device 54 that permits flow into the chamber 42 and a output device 58 that permits flow out of the chamber 42 and into the airbag 20. The input device 54 preferably will allow a large volumetric gas flow rate into the chamber 42 but will prevent a large volumetric flow rate of gas from escaping from the chamber 42. The input device 54 could be, for example, a diaphragm, a one-way valve (such as a flap type valve, a poppet type valve, or a reed type valve), or another device that controls volumetric gas flow across a boundary. As shown in FIG. 3, the input device 54 could have a relatively large input orifice 55 and a pivotally mounted flap 56 that controls flow in and out of the input orifice 55. The input orifice 55 could have an area equal to a maximum of the cross-sectional area of gas-inlet passage 70. The output device 58 preferably will only permit a smaller volumetric gas flow rate out of the chamber 42 and back into the gas-inlet passage 70 and/or directly into the airbag 20. The output device 58 could be, for example, one or more output orifices 59 of fixed size disposed in close proximity to the input device 54, as shown in FIGS. 3 and 4, or one or more output orifices 59 of fixed size disposed at a location farther from the input device 54, as shown in FIG. 5.

Preferably, the input orifice 55 will allow a large volumetric gas flow rate into the chamber 42 but the output orifice(s) 59 will not permit a large volumetric flow rate of gas out of the chamber 42. The cross-sectional areas of the input orifice 55 and the output orifice(s) 59 can be configured based on the desired results. Merely as examples, the total cross-sectional area of the output orifice(s) 59 could be, for example, less than approximately 5% of the cross-sectional area of the input orifice 55, more preferably less than approximately 1%, even more preferably less than approximately 0.1%, and even more preferably less than approximately 0.03%. Thus, the area of the input orifice 55 is significantly larger than the total area of the output orifice(s) 59. This permits quicker gas flow into the chamber 42 and slower gas flow out of the chamber 42.

Figure 6:
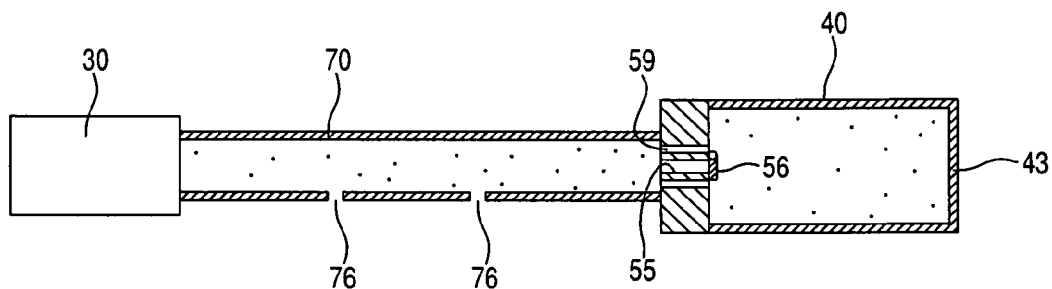
FIG. 6 is a schematic view of the airbag apparatus of FIG. 1 before actuation.
Figure 7:
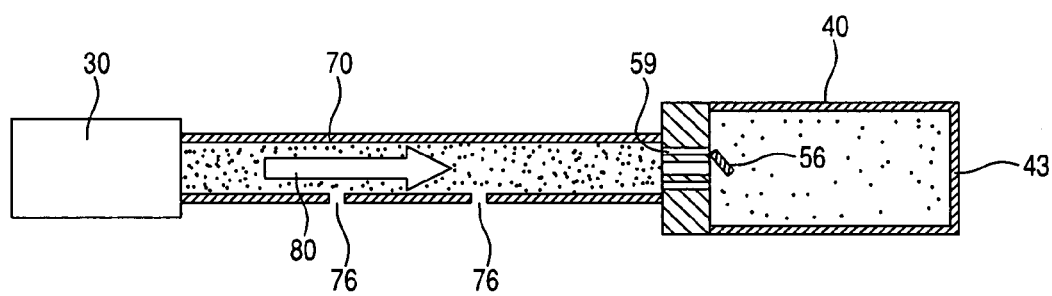
FIG. 7 is a schematic view of the airbag apparatus of FIG. 1 after actuation of an inflator.
Figure 8:
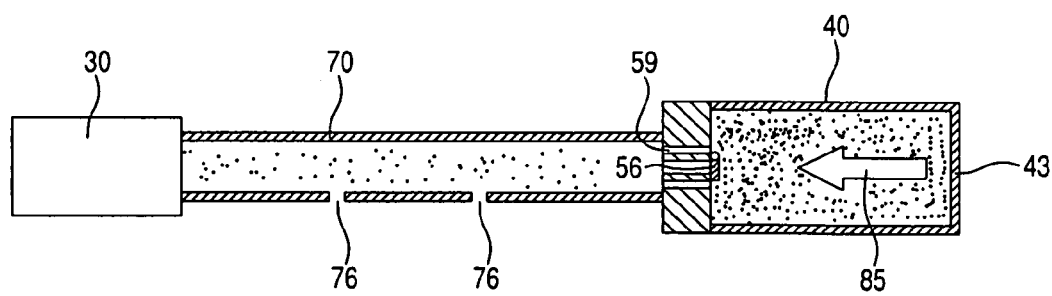
FIG. 8 is a schematic view of the airbag apparatus of FIG. 1 after gas enters an accumulator.

Shock wave phenomenon can be used to cause the accumulator 40 to quickly capture gas and slowly release it, as illustrated in FIGS. 6, 7, and 8. Initially, gas in the gas-inlet passage 70 will be at ambient pressure, as shown in FIG. 6. The gas in the accumulator may be pressurized, but in the embodiment shown in FIG. 6 it is at ambient pressure. When the inflator 30 is actuated, it will pressurize the gas and typically create an incident shock wave 80, causing the gas to flow down the tube at a speed that exceeds the speed of sound. The accumulator 40 can be configured such that the flow of gas/differential pressure across the mechanism will open the flow-control mechanism 50 (e.g., the flap 56 of the input device 54) to allow for additional pressurization of the chamber 42 through the relatively large input orifice 55. Within the chamber 42 of the accumulator 40, the reversal in direction of gas flow (differential pressure) will cause the in-flow control valve 56 to close. The gas will only be able to escape through the smaller output orifices 59.

Figure 9:
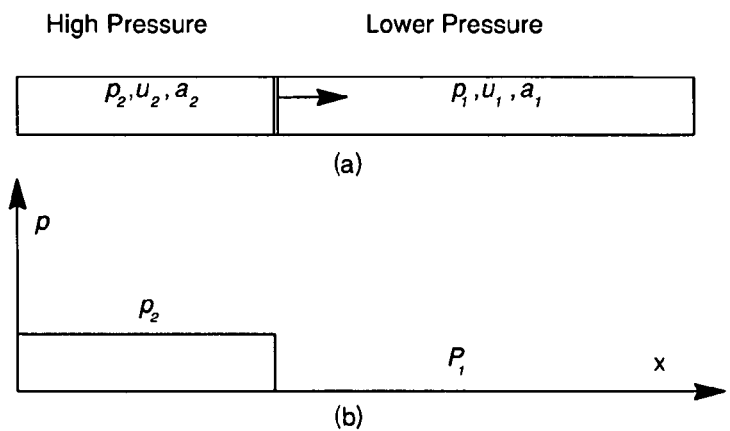
FIG. 9 is an illustration of shock propagation along a tube before reflection on the tube end.
Figure 10:
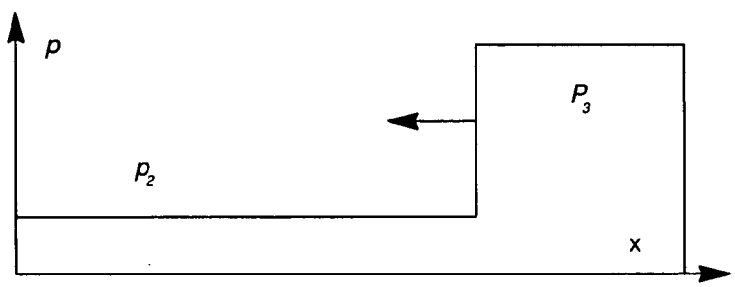
FIG. 10 is an illustration of shock propagation along a tube after reflection on the tube end.
Figure 11:
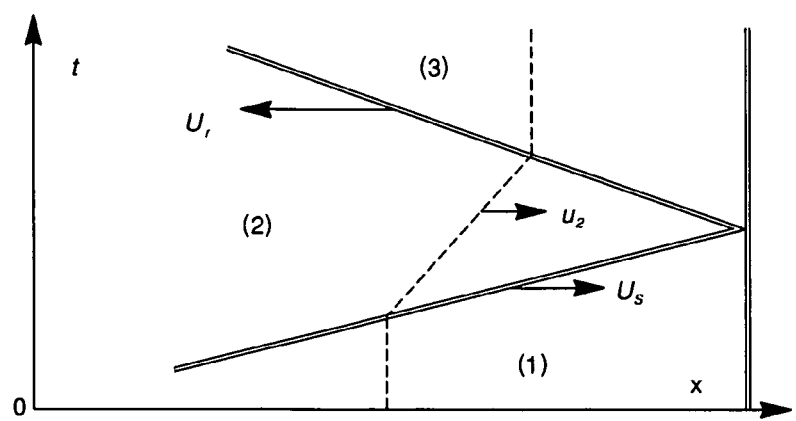
FIG. 11 is a diagram of the process of shock propagation and reflection on a tube.

Shock wave phenomenon will cause the gas in the accumulator 40 to be highly pressurized. Preferably the maximum pressure of gas in the chamber 42 is at least two times greater than the pressure of gas in the tube 70 connecting the inflator 30 and the accumulator 40. Calculating the shock wave reflection of a strong incident shock in the mixture of ideal gases reveals that the pressure in the reflected shock wave can be eight times greater than the pressure in the incident shock wave. The following calculations are provided merely as examples for the purpose of explanation. In these calculations, it is assumed that the gas inlet passage 70 and accumulator 40 are a straight tube with a closed end that is the same as a shock tube. As shown in FIG. 9(a) a high-pressure gas ($P_2, u_2, a_2$) propagates downstream (to the right) to where a low-pressure gas ($p_1, u_1, a_1$) is located. The symbols $p_i$, $u_i$ and $a_i$ are used to indicate the pressure, gas velocity, and speed of the sound in state i. There is an incident shock wave, s, at the discontinuity surface between state 1 and state 2. FIG. 9(b) shows the pressure distribution along the tube before the shock reflection at the tube end. After shock reflection at the tube end, the reflected shock will move upstream (to the left) and interact with incoming shock flow. The gas state behind the reflected shock is state 3. FIG. 10 shows the pressure distribution along the tube after the shock reflection. FIG. 11 is a diagram of the process of the shock wave propagation and reflection on the tube, where $U_s$ and $U_r$ are the speed of the incident shock and reflected shock, respectively.

The Mach number for the incident shock and the reflected shock can be given by $$M_s = \frac{U_s}{a_1} \quad (1)$$

$$M_r = \frac{U_r + u_2}{a_2} \quad (2)$$

The pressure between the state behind the incident shock (state 2) and state behind the reflected shock (state 3) are $$\frac{p_2}{p_1} = \frac{2kM_s^2 - (k-1)}{k+1} \quad (3)$$

$$\frac{p_3}{p_1} = \frac{2kM_r^2 - (k-1)}{k+1} \quad (4)$$

Assuming the velocity of the gas in front of the incident shock and reflected shock are zero, $u_1 = u_3 = 0$, the flow velocity of the incident shock relative to state 1 and 2 can be written as $$\frac{u_2}{a_1} = \frac{2}{k+1}\left(M_s - \frac{1}{M_s}\right) = \frac{(1-\mu)\left[\left(\frac{p_2}{p_1}\right) - 1\right]}{\sqrt{(1+\mu)\left[\left(\frac{p_2}{p_1}\right) + \mu\right]}} \quad (5)$$

$$\frac{u_2}{a_2} = \frac{2}{k+1}\left(M_r - \frac{1}{M_r}\right) = \frac{(1-\mu)\left[\left(\frac{p_3}{p_2}\right) - 1\right]}{\sqrt{(1+\mu)\left[\left(\frac{p_3}{p_2}\right) + \mu\right]}} \quad (6)$$

Where, $\mu = (k-1)/(k+1)$

Based on aerodynamics theory, the rate of the sound speed between state 2 and state 1 is $$\left(\frac{a_2}{a_1}\right)^2 = \frac{p_2}{p_1}\left(1 + \eta\frac{p_2}{p_1}\right)/\left(\mu + \frac{p_2}{p_1}\right) \quad (7)$$

Using Eqs. (5), (6), and (7), the pressure rate between reflected shock and incident shock is $$\frac{p_3}{p_2} = \frac{(1+2\mu)\left(\frac{p_2}{p_1}\right) - \mu}{\mu\left(\frac{p_2}{p_1}\right) + 1} \quad (8)$$

From Eq. (3), the Eq. (8) can be written as $$\frac{p_3}{p_2} = \frac{(3k-1)M_s^2 - 2(k-1)}{(k-1)M_s^2 + 2} \quad (9)$$

In the case of a strong incident shock, i.e. $p_2/p_1 \to \infty$, an approximate expression for the Eq. (9) yields $$\left(\frac{p_3}{p_2}\right)_{max} = 2 + \frac{1}{\eta} = \frac{3k-1}{k-1} \quad (10)$$

where k is the specific heat ratio. If it is assumed that k=1.4 for the mixture of ideal gases, the pressure rate between reflected shock and incident shock can be calculated from the above equation $$\left(\frac{p_3}{p_2}\right)_{max} = 8.0 \quad (11)$$

In sum, the maximum pressure of the reflected shock flow can be as much as 8 times higher than in the incident inflator flow for the ideal fill tube. The shock wave reflection thus can cause the accumulator 40 to store highly pressurized gas in its chamber 42.

Based on the ideal gas law, the mass flow rate $\dot{m}$ into and out of the accumulator 40 can be described by the following equation:

$$\dot{m} = A_{valve}\sqrt{2\rho\Delta p}$$

Where:
$A_{valve}$ = the area of the valve;

ρ=the density of the inflator gas; and

Δp=a pressure difference between gas inside and outside of the flow-control mechanism 50.

As shown above, the pressure difference between reflected shock and incident shock can be eight times (i.e., Δp=8.0). In such a case, the mass flow rate ṁ out from the valve can be given as:

$$\Delta \dot{m} = A_{valve} \sqrt{16\rho}$$

Due to the difference in the size of $A_{valve}$ for input and for output, the mass flow rate ṁ into the accumulator 40 would be very high, while the mass flow rate ṁ out of the accumulator 40 would be much lower.

Accordingly, an airbag apparatus 10 according to the present invention can be configured to provide extended gas flow over time to maintain pressure in the airbag 20. This extended flow can be desirable for a variety of reasons.

For example, the extended flow enabled by the present invention allows for configurations that are conducive to use with higher temperature gas inflators. Gas in an airbag 20 may decrease in volume as it cools, thus reducing the inflating pressure on the airbag 20. If an embodiment of the present invention is configured to continue to supply gas to the airbag 20 over an extended period of time, the continued flow of gas can compensate for such a volume change and thereby maintain the pressure inside of the airbag 20. An embodiment of the present invention can thus be configured to make feasible the use of higher temperature inflators, even for rollover applications.

As another example, the extended flow enabled by the present invention allows for use of a variety of airbags. Unsealed, partially sealed, and higher permeability airbags lose gas over time. The extended supply of inflation gas that can be provided by the airbag apparatus 10 of the present invention allows such airbags to continue to function effectively.

An airbag apparatus 10 according to the present invention can be configured to reduce gas energy loss by decreasing the peak pressure of the inflator gas in the gas-inlet passage 70. The gas energy loss in the airbag 20 mainly occurs due to gas leakage and heat loss by the gas. The amounts of the gas leakage and the heat loss are a function of the gas pressure in the airbag 20, as most of the gas energy loss occurs at the time of peak pressure within the airbag 20. In other words, a higher peak pressure in the airbag 20 causes greater gas energy loss. Relative to a conventional airbag system, an airbag apparatus 10 having an accumulator 40 according to the present invention will have a lower peak pressure after the shock wave reflection in the gas. The accumulator 40 will contain the original peak pressure of the shock wave, and relatively slowly release a smaller amount of reflected shock through output orifices 59. Consequently, the use of the accumulator 40 can reduce the energy loss of the gas in the airbag 20.

An airbag apparatus 10 according to the present invention can be configured to decrease the temperature of gas provided by an inflator 30. The airbag apparatus 10 can have a gas-inlet passage 70 and/or accumulator 40 that are constructed of materials and configurations to help dissipate or extract heat from the generated gas. For example, the gas-inlet passage 70 and the accumulator 40 can be made of a material, such as metals known in the art, that will act as a heat sink. The gas-inlet passage 70 and the accumulator 40 thus will reduce the heat of the gas before the gas reaches the airbag 20, which can permit the use of inflators that produce high temperature gas.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An airbag apparatus comprising:
   an airbag configured to be stored in a vehicle before inflation;
   an inflator configured to provide gas for inflating the airbag; and
   an accumulator in fluid communication with the airbag and the inflator, wherein the accumulator includes a chamber for at least temporarily storing gas after the inflator provides gas, and a flow-control mechanism configured to permit gas to flow into the chamber at a first rate and to flow out of the chamber at a slower second rate, and
   wherein the chamber is configured to substantially elastically expand when subjected to pressurized gas to increase in volume.

2. The airbag apparatus of claim 1, wherein the airbag is configured to be stored in an upper side portion of a body of the vehicle along a fore-and-aft direction thereof.

3. An airbag apparatus, comprising:
   an airbag configured to be stored in a vehicle before inflation;
   an inflator configured to provide gas for inflating the airbag; and
   an accumulator in fluid communication with the airbag and the inflator, wherein the accumulator includes a chamber for at least temporarily storing gas after the inflator provides gas, and a flow-control mechanism configured to permit gas to flow into the chamber at a first rate and to flow out of the chamber at a slower second rate, and
   wherein the flow-control mechanism includes a two way valve that permits gas to flow into the chamber and out of the chamber.

4. The airbag apparatus of claim 3, wherein the chamber has a fixed volume.

5. The airbag apparatus of claim 3, wherein the inflator is configured to cause a gas pressure differential that opens the two way valve to permit gas flow into the chamber, and the chamber is configured to subsequently cause a gas pressure differential that inhibits gas flow into the chamber.

6. The airbag apparatus of claim 1, wherein the flow-control mechanism includes an input device that permits gas to flow into the chamber and an output device that permits gas to flow out of the chamber.

7. The airbag apparatus of claim 6, wherein the inflator is configured to cause a gas pressure differential that opens the input device to permit gas flow into the chamber, and the chamber is configured to subsequently cause a gas pressure differential that inhibits gas flow into the chamber.

8. An airbag apparatus comprising:
   an airbag configured to be stored in a vehicle before inflation;
   an inflator configured to provide gas for inflating the airbag; and
   an accumulator in fluid communication with the airbag and the inflator, wherein the accumulator includes a chamber for at least temporarily storing gas after the inflator provides gas, and a flow-control mechanism configured to permit gas to flow into the chamber at a first rate and to flow out of the chamber at a slower second rate, and
   wherein the inflator is configured to produce an incident shock wave in the gas and the chamber is configured to produce a shock wave reflection in the gas, such that a maximum pressure of gas in the chamber is at least 2 times greater than a pressure of gas provided by the inflator.

9. An airbag apparatus comprising:

an airbag configured to be stored in a vehicle before inflation;

an inflator configured to provide gas for inflating the airbag; and an accumulator in fluid communication with the airbag and the inflator, wherein the accumulator includes a chamber for at least temporarily storing gas after the inflator provides gas, and a flow-control mechanism configured to permit gas to flow into the chamber at a first rate and to flow out of the chamber at a slower second rate, and wherein the accumulator is configured such that a maximum-volumetric-gas-flow rate into the accumulator is equal to a volumetric-gas-flow rate output by the inflator and a maximum-volumetric-gas-flow rate out of the accumulator is no greater than 75% of the maximum-volumetric-gas-flow rate into the accumulator.

10. The airbag apparatus of claim 9, wherein the accumulator is configured such that a maximum amount of gas is introduced to the chamber in less than 10 milliseconds and the accumulator releases gas into the airbag for at least 0.1 seconds.

11. The airbag apparatus of claim 9, wherein the accumulator is configured such that a maximum amount of gas is introduced to the chamber in less than 5 milliseconds and the accumulator releases gas into the airbag for at least 0.5 seconds.

12. An airbag apparatus comprising:

an airbag configured to be stored in a vehicle before inflation;

an inflator configured to provide gas for inflating the airbag; and an accumulator in fluid communication with the airbag and the inflator, wherein the accumulator includes a chamber for at least temporarily storing gas after the inflator provides gas, and a flow-control mechanism configured to permit gas to flow into the chamber at a first rate and to flow out of the chamber at a slower second rate, and further comprising a gas-inlet passage in fluid communication with the inflator and the accumulator, the gas-inlet passage having gas exhaust ports for introducing gas into the airbag.

* * * * *